United States Patent
Fan et al.

(10) Patent No.: US 11,047,770 B2
(45) Date of Patent: Jun. 29, 2021

(54) MASS-BALANCE MEANS AND ROTARY MICROTOME HAVING SAME

(71) Applicant: LEICA MICROSYSTEMS LTD., SHANGHAI, Shanghai (CN)

(72) Inventors: Zheguang Fan, Shanghai (CN); Xiangyu Hao, Shanghai (CN); Xiaoqi Jiang, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 0 days.

(21) Appl. No.: 16/604,170

(22) PCT Filed: Apr. 10, 2018

(86) PCT No.: PCT/CN2018/082478
§ 371 (c)(1),
(2) Date: Oct. 10, 2019

(87) PCT Pub. No.: WO2018/188581
PCT Pub. Date: Oct. 18, 2018

(65) Prior Publication Data
US 2020/0116597 A1    Apr. 16, 2020

(30) Foreign Application Priority Data

Apr. 13, 2017 (CN) .......................... 201710239717.5

(51) Int. Cl.
*G01N 1/06* (2006.01)
*G01M 1/36* (2006.01)

(52) U.S. Cl.
CPC ................ *G01N 1/06* (2013.01); *G01M 1/36* (2013.01); *G01N 2001/065* (2013.01)

(58) Field of Classification Search
CPC ...... G01N 2001/065; G01N 1/06; G01M 1/34
See application file for complete search history.

(56) References Cited

U.S. PATENT DOCUMENTS

| | | | |
|---|---|---|---|
| 4,354,386 A * | 10/1982 | Newton | B24B 49/165 |
| | | | 73/460 |
| 9,606,026 B2 * | 3/2017 | Heid | G01N 1/06 |
| 2015/0047464 A1 * | 2/2015 | Fan | F16H 3/34 |
| | | | 74/810.1 |

\* cited by examiner

*Primary Examiner* — Omar Flores Sanchez
(74) *Attorney, Agent, or Firm* — Hodgson Russ LLP

(57) ABSTRACT

A mass-balance means and a rotary microtome having the same are provided in the present disclosure. The mass-balance means includes: a connecting element, a first end of the connecting element being configured to be connected with a movable mass of the rotary microtome; a gear set having a preset gear ratio, a first end of the gear set being connected with a second end of the connecting element; an elastic element, the elastic element being pre-tensioned and adjustable, in which a first end of the elastic element is connected with a second end of the gear set for moving along with a rotation of the gear set so as to balance the movable mass.

20 Claims, 2 Drawing Sheets

MASS-BALANCE MEANS AND ROTARY MICROTOME HAVING SAME

CROSS-REFERENCE TO RELATED APPLICATIONS

The present application is a U.S. National Phase application under 35 USC § 371 of the International Patent Application No. PCT/CN2018/082478, filed on Apr. 10, 2018, which claims priority to and benefit of Chinese Patent Application No. 201710239717.5 filed on Apr. 13, 2017 to China National Intellectual Property Administration, and disclosures of the above patent are incorporated herein by reference. The entire contents of the before-mentioned patent application are incorporated by reference as part of the disclosure of this U.S. application.

FIELD

The present disclosure relates to a technical field of a microscope, and specifically, to a mass-balance means and a rotary microtome having the mass-balance means.

BACKGROUND

A cutter is used to slice a specimen. A section is arranged onto a cover glass, dealt appropriately, and then positioned in a microscope to be examined. A microtome, especially a rotary microtome generally includes an object carriage. The object carriage carries a specimen holder that holds the specimen to be cut. The object carriage is driven to move up and down in a vertical path of the rotary microtome by a drive means. During this vertical movement, the specimen is passed over the cutter fixedly arranged on the rotary microtome.

In conventional rotary microtomes, control of the vertical cutting movement generally takes place by means of a transmission mechanism which is driven by a hand wheel. The transmission mechanism transforms a turning movement of the hand wheel into a vertical movement of the object carriage. In this type of means, moveable masses of the rotary microtome, which include the specimen and all of the moveable components of the microtome, are alternately and repeatedly accelerated and decelerated. Gravitation accelerates the moveable masses during a first half-turn of the hand wheel (downward movement of the object carriage) and decelerates the moveable masses during the second half-turn of the hand wheel (upward movement of the object carriage). Thus, only a force reduced by the force of gravitation is required to be acted on the hand wheel during the downward movement of the object carriage, and a force increased by the force of gravitation is required during the upward movement.

To balance these undesired accelerations and decelerations, the rotary microtomes is provided with a mass-balancing means. The mass-balancing means generally includes an asymmetrical balancing weight which is integrated into the hand wheel. However, where the moveable masses of the rotary microtome are relatively large, the balancing weight must be dimensioned to be correspondingly large, thereby increasing the bulk of the microtome. Furthermore, an asymmetrically formed balancing weight may produce undesirable vibrations in the rotary microtome during relatively fast upward and downward movements of the object carriage. Vibrations in the microtome inevitably lead to specimens to be cut in an unstable state and consequently the specimens cut are unusable.

U.S. Pat. No. 5,881,626 discloses a mass-balance means used for balancing the movable masses of the microtome. The mass-balance means is provided with a lever which is equipped with two level arms arranged at an angle with respect to each other. The force acting on the object carriage can be adapted appropriately in any positions by a leverage provided by the lever arms and the pre-tensioning spring acting on the lower lever arm.

In U.S. Pat. No. 5,881,626, the lever's function is to reduce the moving distance of the spring when the balancing means operates. But the lever only gets very small lever ratio, so the displacement of the spring only reduces a small amount. If a greater level ratio is needed, the balancing means needs much more space, and as a result the volume and weight of the rotary microtomes are increased.

SUMMARY

The present disclosure seeks to solve one of the technical problems existing in the related art at least in some extent. Accordingly, one object of the present disclosure is to provide a mass-balance means used for a rotary microtome, which can realize a larger gear ratio in a limited space of the rotary microtome, so that the volume and weight of the rotary microtomes are reduced when the movable masses of the microtome are balanced.

The mass-balance means according to embodiments of the present disclosure is used for a rotary microtome and includes: a connecting element, a first end of the connecting element being configured to be connected with a movable mass of the rotary microtome; a gear set having a preset gear ratio, a first end of the gear set being connected with a second end of the connecting element; an elastic element, the elastic element being pre-tensioned and adjustable, in which a first end of the elastic element is connected with a second end of the gear set for moving along with a rotation of the gear set so as to balance the movable mass.

Another object of the present disclosure is to provide a rotary microtome having a mass-balance means. The mass-balance means includes: a connecting element, a first end of the connecting element being configured to be connected with a movable mass of the rotary microtome; a gear set having a preset gear ratio, a first end of the gear set being connected with a second end of the connecting element; an elastic element, the elastic element being pre-tensioned and adjustable, in which a first end of the elastic element is connected with a second end of the gear set for moving along with a rotation of the gear set so as to balance the movable mass.

DETAILED DESCRIPTION

Figure 1:
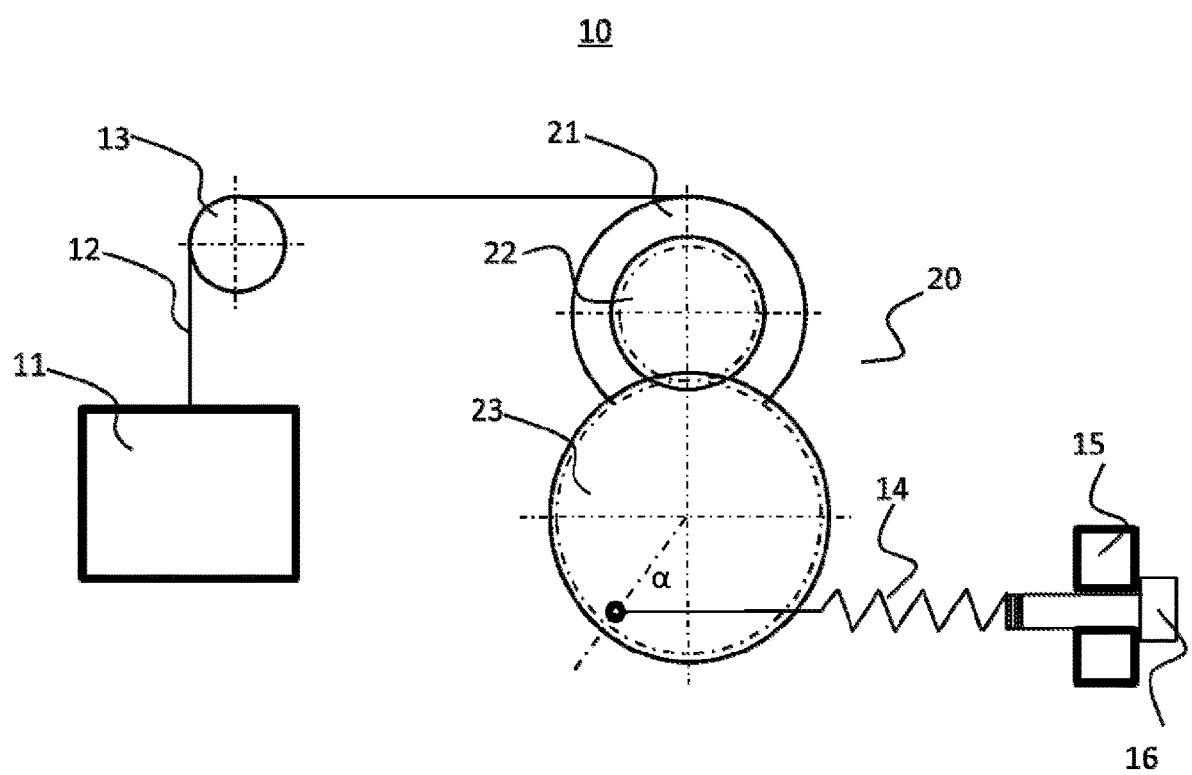
FIG. 1 is a schematic view of a mass-balancing means according to a first embodiment of the present disclosure.

Embodiments of the present disclosure will be described in detail in the following. Examples of the embodiments are shown in the drawings, and the same or similar elements and the elements having same or similar functions are denoted by like reference numerals throughout the descriptions. The embodiments described with reference to the drawings are illustrative, which is only used to explain the present disclosure and shouldn't be construed to limit the present disclosure.

Figure 2:
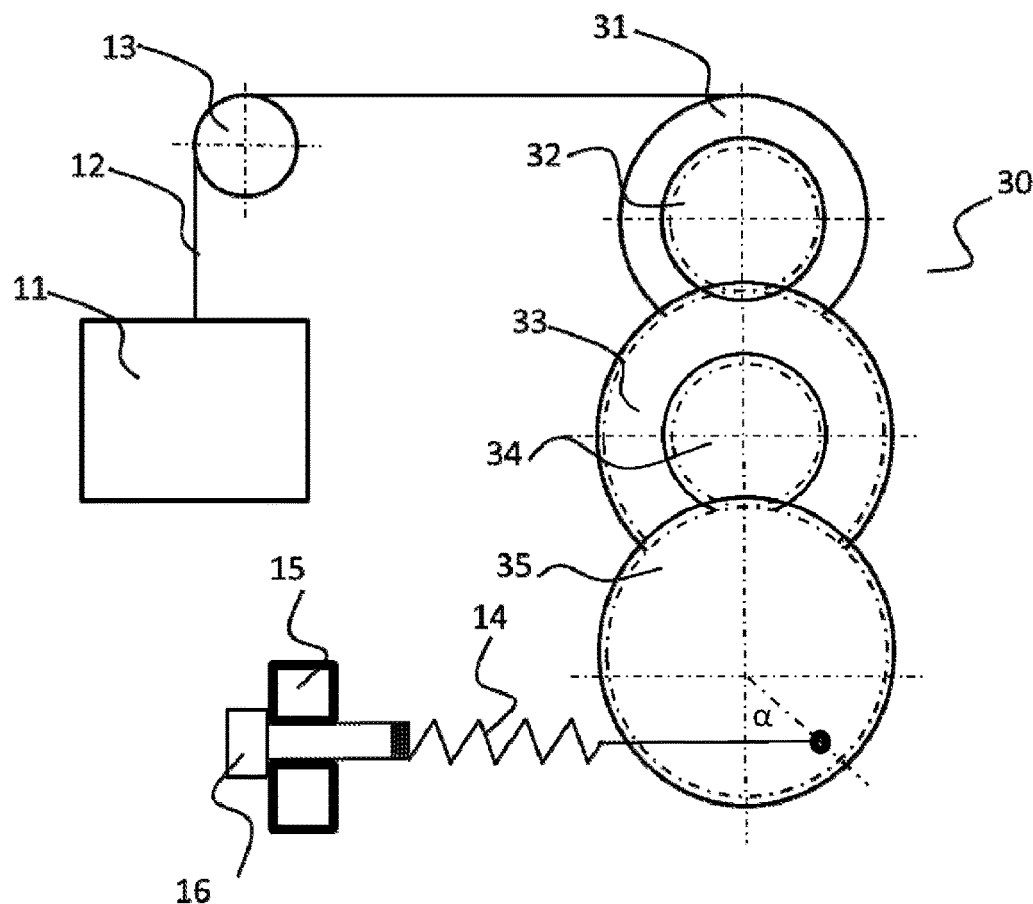
FIG. 2 is a schematic view of a mass-balancing means according to a second embodiment of the present disclosure.

A mass-balance means according to embodiments of the present disclosure is shown in FIG. 1 to FIG. 2.

It should be understood by those skilled in the art that a rotary microtome generally includes: an object carriage mounted with a specimen holder thereon; a cutter holder arranged with a cutter configured to cut a specimen; a drive means used for making the object carriage to move up and down along a vertical path; and a mass-balance means used for balancing a movable mass of the microtome. Term "movable mass" includes all of the moveable components of the microtome, especially the object carriage, the specimen holder, the specimen and other moveable components such as a hand wheel or a fly wheel.

The mass-balance means according to embodiments of the present disclosure includes a connecting element, a gear set, an elastic element and a supporting element. A first end of the connecting element is connected with the movable mass of the rotary microtome. A gear set has a preset gear ratio, and a first end of the gear set is connected with a second end of the connecting element. In some embodiments of the present disclosure, the gear ratio of the gear set is 2-10, however, the present disclosure is not limited to this the gear ratio of the gear set can be set according to an actual requirement. The elastic element is pre-tensioned and adjustable, in which a first end of the elastic element is connected with a second end of the gear set for moving along with a rotation of the gear set so as to balance the movable mass.

In the embodiments of the present disclosure, the gear set includes a driving disc and at least two gears. The driving disc is connected with the second end of the connecting element. One of the at least two gears adjacent to the driving disc is fixed to the driving disc coaxially, another gear of the at least two gears adjacent to the elastic element is connected with the first end of the elastic element.

With the mass-balance means according to embodiments of the present disclosure, a greater gear ratio can be realized via a smaller volume i.e. in the limited space of the rotary microtome, thus a displacement of the elastic element is relatively smaller when the movable mass moves within a certain range. Thus, with the mass-balance means according to embodiments of the present disclosure, the weight and volume of the microtome can be reduced and the manufacturing cost can be cut down while the movable mass of the microtome being balanced, it is also convenient for the operation of the microtome.

The mass-balance means according to specific embodiments of the present disclosure will be described with reference to the drawings in the following.

The mass-balance means 10 according to a first embodiment of the present disclosure is shown in FIG. 1, which includes a connecting element 12, a gear set 20, an elastic element 14, and a supporting element 13. A first end (a lower end of the connecting element 12 in FIG. 1) of the connecting element 12 is connected with the movable mass 11 of the rotary microtome so as to move along with a movable mass 11. In the present embodiment, the connecting element 12 is a conveyor belt, the elastic element 14 is a spring, and the supporting element 13 is a pulley, however, the present disclosure is not limited to this. The connecting element 12 extends upwards and deflected by the supporting element 13, by which the supporting element 13 supports the deflected connecting element 12 and the movable mass 11 connected with the connecting element 12. A first end (An upper end of the gear set 20 in FIG. 1) of the gear set 20 is connected with a second end (a right end of the connecting element 12 in FIG. 1) of the deflected connecting element 12, a second end (a lower end of the gear set 20 in FIG. 1) of the gear set 20 is connected with the first end (a left end of the elastic element 14 in FIG. 1) of the elastic element 14. The elastic element 14 is pre-tensioned and adjustable, which can be adjusted according to the actual requirement so as to provide a suitable elastic force.

Specifically, the gear set 20 includes a driving disc 21, a first gear 22 and a second gear 23. The driving disc 21 is connected with the right end of the connecting element 12 so as to move along with the connecting element 12. The first gear 22 is fixed to the driving disc 21 coaxially, i.e. a center of the first gear 22 is located in a same axis with a center of the driving disc 21, and the first gear 22 is fixedly connected to the driving disc 21, as which the driving disc 21 and the first gear 22 can rotate in a same angular speed.

Further, as shown in FIG. 1, the second gear 23 is located below the first gear 22 and meshed with the first gear 22. Certainly, it should be understood by those skilled in the related art that the second gear 23 may not be located below the first gear 22, in other words, a connecting line of the center of the second gear 23 and the center of the first gear 22 is oblique relative to, even perpendicular to the vertical direction, instead of coinciding with the vertical direction, which can be decided according to a specific interior space of the rotary microtome.

The second gear 23 is connected with the left end of the elastic element 14. A connecting point of the left end of the elastic element 14 and the second gear 23 is located in an edge of the second gear 23. A connecting line of the connecting point and the center of the second gear 23 has an included angle α relative to the vertical direction, and during an operation of the mass-balance means, the included angle α ranges from 20° to 60°, as which a better balancing effect can be realized.

A diameter of the driving disc 21 is D21, a diameter of the first gear 22 is D22, and a diameter of the second gear 23 is D23. The diameter D21 of the driving disc 21 is larger than the diameter D22 of the first gear 22, and the diameter D23 of the second gear 23 is larger than the diameter D22 of the first gear 22. A gear ratio of the gear set 20 is a ratio of the diameter D23 of the second gear 23 to the diameter D22 of the first gear 22, i.e. D23/D22.

In the condition that the diameters of the driving disc 21, the first gear 22 and the second gear 23 satisfy the relations above, the greater gear ratio can be realized in a limited space, thus a displacement of the elastic element 14 is smaller in the operation period of the mass-balance means, that is, the elastic force of the elastic element 14 changes less, a fatigue loss of the elastic element 14 is reduced and a service life of the elastic element 14 is prolonged. In addition, a larger gear ratio can be realized without increasing the occupied space of the mass-balance means 10, as which the weight and volume of the rotary microtome is prevented from increasing, the manufacturing cost of the rotary microtome is reduced, and the rotary microtome is convenient to operate.

A second end (a right end of the elastic element 14 as shown in FIG. 1) of the elastic element 14 is connected to a base frame 15 of the rotary microtome. For example, the right end of the elastic element 14 can be connected to the base frame 15 through an adjustable tensioning screw 16, as which the elastic element 14 can be tensioned according to the actual requirement.

The operating process of the mass-balance means 10 according to the first embodiment of the present disclosure will be described in detail with reference to FIG. 1 in the following.

When an external force is applied to make the movable mass 11 to move downwards, the connecting element 12 moves along with the movable mass 11 and drives the driving disc 21 to rotate counterclockwise. The first gear 22 fixedly connected with the driving disc 21 also rotates counterclockwise, the second gear 23 meshed with the first gear 22 rotates clockwise and drives the left end of the elastic element 14 to move leftwards. Consequently, a force arm of the elastic force of the elastic element 14 relative to the center of the second gear 23 decreases. However, as the elastic element 14 is tensioned further, the elastic force of the elastic element 14 increases, a product of the elastic force and the corresponding force arm is basically the same, as a result the gravitation acted on the movable mass 11 is counteracted, and an undesired acceleration of the gravitation acted on the movable mass 11 is prevented.

When an external force is applied to make the movable mass 11 to move upwards, the second gear 23 rotates counterclockwise under the action of the elastic force of the elastic element 14 and drives the first gear 22 meshed with the second gear 23 to rotate clockwise. The driving disc 21 fixedly connected with the first gear 22 also rotates clockwise, thus the connecting element 12 is driven to move so as to apply an acting force to the movable mass 11. During the upward movement of the movable mass 11, the left end of the elastic element 14 move rightwards, the force arm of the elastic force relative to the center of the second gear 23 increases, but, the tensioning degree of the elastic element 14 is reduced, the elastic force of the elastic element 14 decreases, as a result the product of the elastic force and the corresponding force arm is also basically the same, as which the gravitation acted on the movable mass 11 is counteracted, and an undesired deceleration of the gravitation acted on the movable mass 11 is prevented.

In the operation process above, the included angle α ranges from 20° to 60° so as to guarantee the normal operation of the mass-balance means 10 and realize a predicted effect.

However, in the condition that the included angle α is too small, when the movable mass 11 move downwards, the elastic force of the elastic element 14 increases and the corresponding force arm decreases, the increasing quantity of the force arm is less, so the product of the elastic force 14 and the corresponding force arm increases i.e. the product is greater than the gravitation acted on the movable mass 11, which leads to the undesired acceleration to the movable mass 11.

In the condition that the included angle α is too large, when the movable mass 11 move downwards, the elastic force of the elastic element 14 increases and the corresponding force arm decreases, the increasing quantity of the force arm is greater, so the product of the elastic force 14 and the corresponding force arm decreases i.e. the product is smaller than the gravitation acted on the movable mass 11, so the gravitation acted on the movable mass 11 cannot be counteracted and the gravitation still leads to the undesired acceleration to the movable mass 11.

The mass-balance means 40 according to a second embodiment of the present disclosure is shown in FIG. 2.

The second embodiment shown in FIG. 2 is similar to the first embodiment shown in FIG. 1, which only differs in the gear set. For the sake of simplicity, only the gear set is described in detail in the following.

The mass-balance means 40 according to the second embodiment of the present disclosure includes a gear set 30. The gear set 30 includes a driving disc 31, a first gear 32, a second gear 33, a third gear 34 and a fourth gear 35. The driving disc 31 is connected with the right end of the connecting element 12 so as to move along with the connecting element 12. The first gear 32 is fixed to the driving disc 31 coaxially, i.e. a center of the first gear 32 is located in a same axis with a center of the driving disc 31, and the first gear 32 is fixedly connected to the driving disc 31, as which the driving disc 31 and the first gear 32 can rotate in a same angular speed.

As shown in FIG. 2, the second gear 33 is located below the first gear 32 and meshed with the first gear 32. Certainly, similar to the first embodiment of the present disclosure, a connecting line of the center of the second gear 33 and the center of the first gear 32 may be oblique relative to, even perpendicular to the vertical direction, instead of coinciding with the vertical direction, which can be decided according to a specific interior space of the rotary microtome.

The third gear 34 is fixed to the second gear 33 coaxially, i.e. a center of the third gear 34 is located in a same axis with a center of the second gear 33, and the third gear 34 is fixedly connected to the second gear 33, as which the third gear 34 and the second gear 33 can rotate in a same angular speed.

Further, as shown in FIG. 2, the fourth gear 35 is located below the third gear 34 and meshed with the third gear 34. Certainly, similar to a position relationship between the second gear 33 and the first gear 32, a connecting line of the center of the fourth gear 35 and the center of the third gear 34 is oblique relative to, even perpendicular to the vertical direction, instead of coinciding with the vertical direction, which can be decided according to a specific interior space of the rotary microtome.

The fourth gear 35 is connected with the first end (a right end of the elastic element 14 shown in FIG. 2) of the elastic element 14. A connecting point of the right end of the elastic element 14 and the fourth gear 35 is located in an edge of the fourth gear 35. A connecting line of the connecting point and the center of the fourth gear 35 has an included angle α relative to the vertical direction, and during an operation of the mass-balance means, the included angle α ranges from 20° to 60°, such that a better balancing effect can be realized.

A diameter of the driving disc 31 is D31, a diameter of the first gear 32 is D32, a diameter of the second gear 33 is D33, a diameter of the third gear 34 is D34, and a diameter of the fourth gear 35 is D35. The diameter D31 of the driving disc 31 is larger than the diameter D32 of the first gear 32. The diameter D33 of the second gear 33 is larger than the diameter D32 of the first gear 32. The diameter D33 of the second gear 33 is larger than the diameter D34 of the third gear 34. The diameter D35 of the fourth gear 35 is larger than the diameter D34 of the third gear 34. A gear ratio of the gear set 30 is a product of a ratio of the diameter D33 of the second gear 33 to the diameter D32 of the first gear 32 and a ratio of the diameter D35 of the fourth gear 35 to the diameter D34 of the third gear 34, i.e. (D33/D32)×(D35/D34).

In the condition that the driving disc 31, the first gear 32, the second gear 33, the third gear 34 and the fourth gear 35 satisfy the relations above, the gear ratio can be increased further, thus the displacement of the elastic element 14 is much more smaller in the operation period of the mass-balance means 40, that is, the elastic force of the elastic element 14 changes even less, a fatigue loss of the elastic element 14 is further reduced and a service life of the elastic element 14 is prolonged. As the displacement of the elastic element 14 is reduced further, the space the elastic element 14 needs is reduced further, which is equivalent to further reducing the volume and weight of the rotary microtome and decreasing the manufacturing cost of the rotary microtome.

The second end (a left end of the elastic element 14 shown in FIG. 2) of the elastic element 14 is connected to the base frame 15 of the rotary microtome. For example, the left end of the elastic element 14 can be connected to the base frame 15 through the adjustable tensioning screw 16, as which the elastic element 14 can be tensioned according to the actual requirement.

The operating process of the mass-balance means 40 according to the second embodiment of the present disclosure is similar to the operating process of the mass-balance means 10 according to the first embodiment of the present disclosure, and principles of both operating processes are that the gravitation acted on the movable mass is balanced by means of the equal force produced by the interaction of the gear set and the elastic element, so the operating process of the mass-balance means 40 according to the second embodiment of the present disclosure will not be repeated here.

Figure 3:
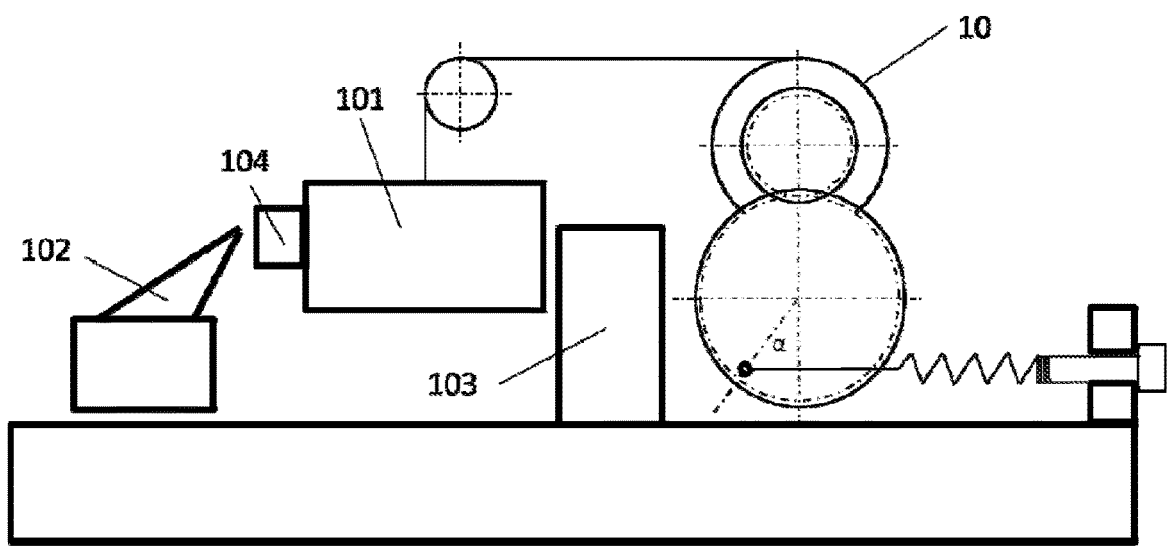
FIG. 3 is a schematic view of a rotary microtome according to an embodiment of the present disclosure.

A rotary microtome 100 is further provided in the embodiments of the present disclosure, as shown in FIG. 3, the rotary microtome 100 according to embodiments of the present disclosure includes an object carriage 101, a cutter holder 102, a drive means 103 and a mass-balance means according to embodiment of the present disclosure above. The object carriage 101 is arranged with a specimen 104 to be cut. In addition, it should be noted that, although the mass-balance means shown in FIG. 3 is the mass-balance means 10 according to the first embodiment, it could be understood by those skilled in the art that the rotary microtome according to embodiments of the present disclosure may also include the mass-balance means 40 according to the second embodiment of the present disclosure.

The rotary microtome according to embodiments of the present disclosure is equipped with a mass-balance means having a larger gear ratio in a limited space thereof without a need to increase the volume and weight, so the microtome has advantages of a small volume, a lighter weight and a convenient operation.

In the specification, it should be understood that terms such as "center", "longitudinal", "lateral", "length", "width", "depth", "up", "down", "front", "rear", "left", "right", "vertical", "horizontal", "top", "bottom", "inner", "outer", "clockwise", "counterclockwise", "axial direction", "radial direction", "circumferential direction" should be construed to refer to the orientation as then described or as shown in the drawings under discussion. These relative terms are for convenience of description and do not require that the present disclosure be constructed or operated in a particular orientation, so shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" should be understood broadly, and may be, for example, fixed connections, detachable connections, or integral connections; may also be direct connections or indirect connections via intervening structures; may also be inner communications or interaction relationships of two elements, unless specified or limited otherwise, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples. In addition, the different embodiments or examples can be combined or united by those skilled in the related art.

Although embodiments of the present disclosure have been shown and described, it would be appreciated that the embodiments above are illustrative and shall not be construed to limit the present disclosure, changes, alternatives, variation and modifications can be made in the embodiments without departing from the scope of the present disclosure by those skilled in the art.

What is claimed is:

1. A mass-balance means for balancing a movable mass of a rotary microtome, the mass-balance means comprising:
    a connecting element having a first end and a second end, the first end of the connecting element being configured to be connected with the movable mass of the rotary microtome;
    a gear set having a first rotational part and a second rotational part related to the first rotational part by a preset gear ratio, the first rotational part of the gear set being connected with the second end of the connecting element; and
    an elastic element having a first end and a second end, the elastic element being pre-tensioned and adjustable, wherein the first end of the elastic element is connected with the second rotational part of the gear set for moving along with a rotation of the gear set so as to balance the movable mass.

2. The mass-balance means according to claim 1, wherein the gear set comprises:
    a driving disc connected with the second end of the connecting element; and at least two gears, wherein one of the at least two gears adjacent to the driving disc is fixed to the driving disc coaxially, another gear of the at least two gears adjacent to the elastic element is connected with the first end of the elastic element.

3. The mass-balance means according to claim 2, wherein the at least two gears comprise:
   a first gear fixed to the driving disc coaxially; and
   a second gear meshed with the first gear and connected with the first end of the elastic element.

4. The mass-balance means according to claim 3, wherein a diameter of the driving disc is larger than a diameter of the first gear, a diameter of the second gear is larger than the diameter of the first gear, and the gear ratio of the gear set is a ratio of the diameter of the second gear to the diameter of the first gear.

5. The mass-balance means according to claim 2, wherein the at least two gears comprise:
   a first gear fixed to the driving disc coaxially;
   a second gear meshed with the first gear;
   a third gear fixed to the second gear coaxially; and
   a fourth gear meshed with the third gear and connected with the first end of the elastic element.

6. The mass-balance means according to claim 5, wherein a diameter of the driving disc is larger than a diameter of the first gear, a diameter of the second gear is larger than the diameter of the first gear, the diameter of the second gear is larger than a diameter of the third gear, a diameter of the fourth gear is larger than the diameter of the third gear, the gear ratio of the gear set is a product of a ratio of the diameter of the second gear to the diameter of the first gear and a ratio of the diameter of the fourth gear to the diameter of the third gear.

7. The mass-balance means according to claim 2, wherein a connecting point of the first end of the elastic element and the one gear of the at least two gears adjacent to the elastic element is located in a radially outer edge region of the one gear of the at least two gears adjacent to the elastic element.

8. The mass-balance means according to claim 7, wherein a connecting line of the connecting point and a center of the one gear of the at least two gears adjacent to the elastic element has an included angle α relative to a vertical direction, and during an operation of the mass-balance means, the included angle α ranges from 20° to 60°.

9. The mass-balance means according to claim 1, further comprising a supporting element configured to support and deflect the connecting element.

10. The mass-balance means according to claim 1, wherein the elastic element is a spring.

11. The mass-balance means according to claim 1, wherein the connecting element is a conveyor belt.

12. The mass-balance means according to claim 1, wherein the second end of the elastic element is connected to a base frame of the rotary microtome through an adjustable tensioning screw.

13. A rotary microtome, comprising a movable mass and a mass-balance means for balancing the movable mass, and the mass-balance means comprising:
   a connecting element having a first end and a second end, the first end of the connecting element being configured to be connected with the movable mass of the rotary microtome;
   a gear set having a first rotational part and a second rotational part related to the first rotational part by a preset gear ratio, the first rotational part of the gear set being connected with the second end of the connecting element; and
   an elastic element having a first end and a second end, the elastic element being pre-tensioned and adjustable, wherein the first end of the elastic element is connected with the second rotational part of the gear set for moving along with a rotation of the gear set so as to balance the movable mass.

14. The rotary microtome according to claim 13, wherein the gear set comprises:
   a driving disc connected with the second end of the connecting element; and
   at least two gears, wherein one of the at least two gears adjacent to the driving disc is fixed to the driving disc coaxially, another gear of the at least two gears adjacent to the elastic element is connected with the first end of the elastic element.

15. The rotary microtome according to claim 14, wherein the at least two gears comprise:
   a first gear fixed to the driving disc coaxially; and
   a second gear meshed with the first gear and connected with the first end of the elastic element.

16. The rotary microtome according to claim 15, wherein a diameter of the driving disc is larger than a diameter of the first gear, a diameter of the second gear is larger than the diameter of the first gear, and the gear ratio of the gear set is a ratio of the diameter of the second gear to the diameter of the first gear.

17. The rotary microtome according to claim 14, wherein the at least two gears comprise:
   a first gear fixed to the driving disc coaxially;
   a second gear meshed with the first gear;
   a third gear fixed to the second gear coaxially; and
   a fourth gear meshed with the third gear and connected with the first end of the elastic element.

18. The rotary microtome according to claim 17, wherein a diameter of the driving disc is larger than a diameter of the first gear, a diameter of the second gear is larger than the diameter of the first gear, the diameter of the second gear is larger than a diameter of the third gear, a diameter of the fourth gear is larger than the diameter of the third gear, the gear ratio of the gear set is a product of a ratio of the diameter of the second gear to the diameter of the first gear and a ratio of the diameter of the fourth gear to the diameter of the third gear.

19. The rotary microtome according to claim 14, wherein a connecting point of the first end of the elastic element and the one gear of the at least two gears adjacent to the elastic element is located in a radially outer edge region of the one gear of the at least two gears adjacent to the elastic element.

20. The rotary microtome according to claim 19, wherein a connecting line of the connecting point and a center of the one gear of the at least two gears adjacent to the elastic element has an included angle α relative to a vertical direction, and during an operation of the mass-balance means, the included angle α ranges from 20° to 60°.

\* \* \* \* \*